US006578446B2

(12) United States Patent
Staser et al.

(10) Patent No.: US 6,578,446 B2
(45) Date of Patent: Jun. 17, 2003

(54) BELL CRANK ASSEMBLY AND KIT

(75) Inventors: Brian H. Staser, Rochester Hills, MI (US); Mark A. Vickery, Tecumseh (CA)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/055,429

(22) Filed: Jan. 23, 2002

(65) Prior Publication Data

US 2003/0041686 A1 Mar. 6, 2003

Related U.S. Application Data

(60) Provisional application No. 60/316,341, filed on Aug. 30, 2001.

(51) Int. Cl.[7] ............................ B60J 5/04; G05G 1/04; F16D 3/00; F16L 41/00; F05B 3/00

(52) U.S. Cl. ...................... 74/519; 292/336.3; 292/217; 292/1; 403/165; 403/196; 49/502

(58) Field of Search ............................... 74/519–522.5, 74/500.5–504; 292/336.3, 216, 217, 1; 403/165, 196; 49/502

(56) References Cited

U.S. PATENT DOCUMENTS

| | | | | | |
|---|---|---|---|---|---|
| 5,492,379 | A | * | 2/1996 | Staser et al. | 292/336.3 |
| 5,535,553 | A | * | 7/1996 | Staser et al. | 49/502 |
| 5,733,046 | A | * | 3/1998 | Bellmore et al. | 389/37 |
| 5,845,947 | A | * | 12/1998 | Arabia et al. | 292/1 |
| 5,934,817 | A | * | 8/1999 | Kim et al. | 403/196 |
| 6,116,807 | A | * | 9/2000 | Dzurko et al. | 403/165 |
| 6,406,075 | B1 | * | 6/2002 | Rice et al. | 292/336.3 |
| 2002/0163207 | A1 | * | 11/2002 | Rogers et al. | 292/216 |

FOREIGN PATENT DOCUMENTS

| | | | | |
|---|---|---|---|---|
| EP | 0969 170 A2 | * | 1/2000 | 74/501.5 R |
| JP | 2-213576 | * | 8/1990 | 74/501.5 R |

* cited by examiner

*Primary Examiner*—Vinh T. Luong
(74) *Attorney, Agent, or Firm*—Kathryn A. Marra

(57) ABSTRACT

A bell crank assembly is mounted on an automotive door module of a vehicle that includes a panel. The panel supports a door latch assembly that includes a lock mechanism that is operated by a sill button and rod inside the vehicle that is located on the inner or dry side of the panel and moveable vertically with respect to the panel. The lock mechanism is operated by the sill button and rod via a generally horizontal rod that is located on the exterior or wet side of panel. The bell crank assembly connects the sill button rod to the exterior rod through an extruded hole in the panel. The bell crank assembly includes an inboard lever and an outboard lever. The inboard lever has an input end that is attached to the sill button rod and an output end. The output end has a round boss that fits in the extruded hole of the panel with a running fit to provide an axle for pivoting bell crank assembly with respect to panel. The output end has a shaped projection at an outboard end of the round boss that the fits in a matching hole of the outboard lever so that the levers pivot simultaneously. The shaped projection supports a plurality of cantilevered latch arms that have catches at their respective free ends that extend through the matching hole with the catches engaging an outer surface of the outboard lever adjacent the matching hole. The outboard lever has an input end and an output end. The input end of the outboard lever has a round flange that is spaced outwardly of the shaped hole and that engages the outer side of panel outwardly of the extruded hole to form a seal for the extruded hole. The output end is attached to the exterior rod.

3 Claims, 3 Drawing Sheets

BELL CRANK ASSEMBLY AND KIT

RELATED PATENT APPLICATION

This patent application claims priority of Provisional Patent Application No. 60/316,341 filed Aug. 30, 2001.

FIELD OF INVENTION

This invention relates to a bell crank assembly and kit for a bell crank assembly that operates through a hole in a panel.

BACKGROUND OF THE INVENTION

Automotive door modules are used in the modem construction of automotive doors. These modules generally comprise a panel that supports a door latch assembly that includes a lock mechanism and a sill button for operating the lock mechanism. The door latch usually has a lever for operating the lock mechanism that is located on the exterior or wet side of the panel while the sill button is located on the interior or dry side of the panel. The sill button usually operates the lock mechanism by a rod system that transfers the motion of the sill button to the lever that operates the lock mechanism. Although the door latch is at the rear end of the automotive door, modem automotive designs locate the sill button toward the front of the door. The forward sill button location enhances operator convenience. However, the forward location also produces routing difficulties for the rod system that is further exacerbated by the need for sealing the hole in the panel that the rod system must pass through to connect the interior sill button to the exterior latch lever that operates the lock mechanism. Thus there is a need for providing an efficient and compact mechanism for transferring motion in a rod system through a panel hole and sealing the hole in such a way as to simplify rod routing.

SUMMARY OF THE INVENTION

The invention provides a bell crank assembly and kit for an automotive door module of a vehicle that supports a door latch assembly that includes a lock mechanism on a panel. The lock mechanism is operated by a vertically moveable rod attached to a sill button located on the interior or dry side of panel via a generally horizontal rod that is located on the exterior or wet side of the panel. The bell crank assembly and kit when installed connects the sill button rod to the exterior rod through an extruded hole in the panel. It includes an inboard lever and an outboard lever. The inboard lever has an input end that attaches to the sill button and an output end that has a round boss. The round boss fits in an extruded hole of the panel with a running fit to provide an axle for pivoting the bell crank assembly with respect to the panel. The output end also has a shaped projection at an outboard end of the round boss that the fits in a matching hole at an input end of the outboard lever so that the levers pivot simultaneously. The shaped projection supports a plurality of resilient cantilevered latch arms that have catches at their respective free ends. The plurality of cantilevered latch arms extend through the matching hole with the catches engaging an exterior surface of the outboard lever adjacent the matching hole. The input end of the outboard lever has a round flange that is spaced outwardly of the shaped hole and that engages the outer side of panel outwardly of the extruded hole to form a seal for the extruded hole. The shaped projection preferably fits snugly in the matching hole of the outboard lever to prevent water leakage through the interface. The output end of the outboard lever attaches to the rod.

DETAILED DESCRIPTION OF PREFERRED EMBODIMENT

Figure 1:
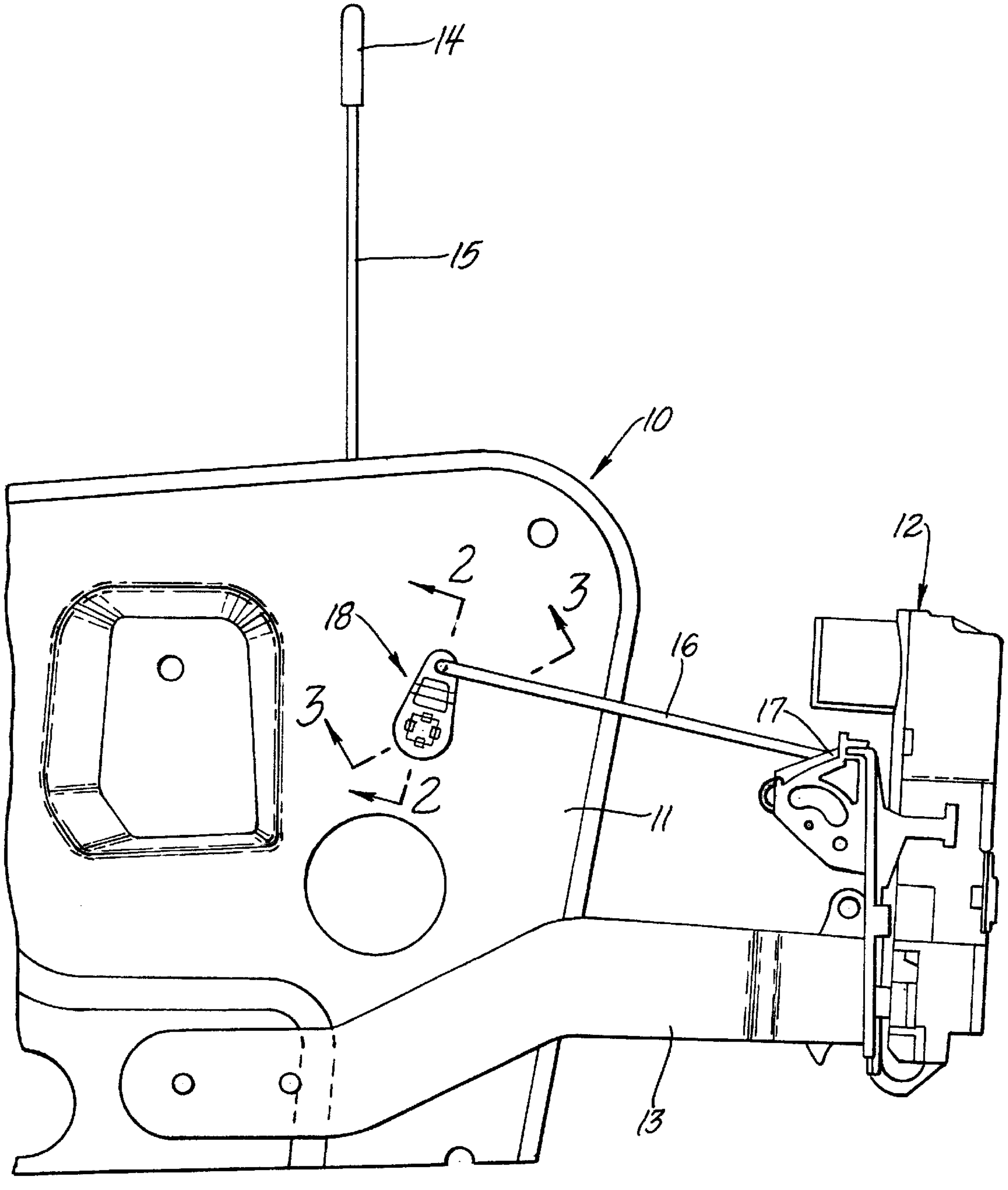
FIG. 1 is an exterior front view of an automotive door module equipped with a bell crank assembly of the invention.

FIG. 1 shows an automotive door module 10 having a panel 11 that supports a door latch assembly 12 at the end of a bracket 13 that is attached to the door panel 11. The door latch 12 not need be described in detail in order to understand the bell crank assembly of the invention. It is merely necessary to know that the door latch assembly 12 includes a lock mechanism that is operated either by a sill button 14 inside the vehicle.

Figure 2:
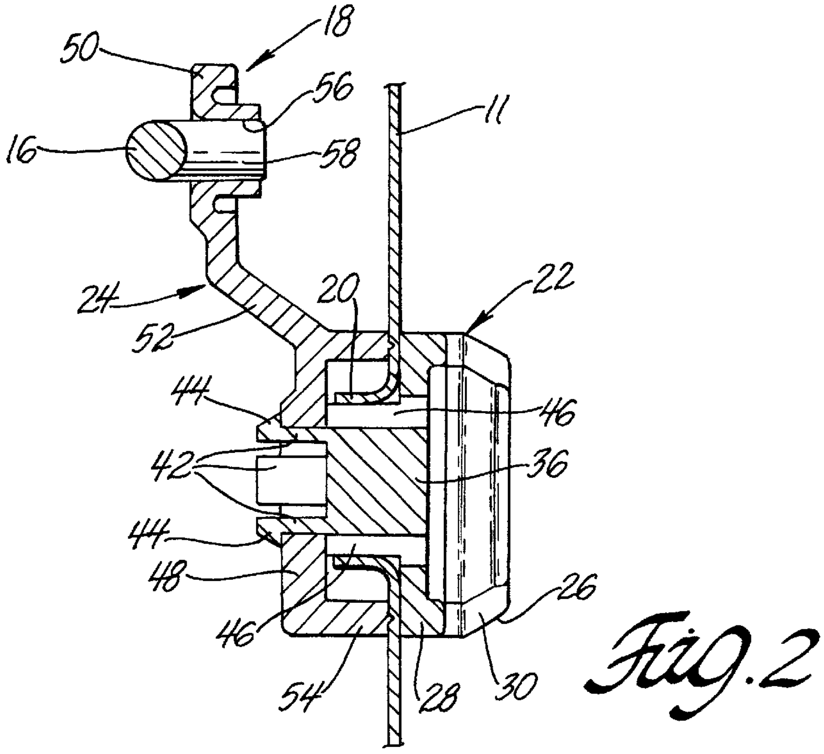
FIG. 2 is a section view taken substantially along the line 2—2 of FIG. 1 looking in the direction of the arrows.

Sill button 14 is located on the interior or dry side of panel 11 which is part of door module 10. Door modules which are known and commonly used in the assembly of vehicle doors generally comprise several components that are attached to a support panel to form a subassembly that is attached to a vehicle door shell. Sill button 14 is attached to an interior rod 15 that moves vertically with respect to panel 11 and operates the lock mechanism of door latch assembly 12 via a generally horizontal exterior rod 16 that is located on the exterior or wet side of panel 11. Rod 16 is connected to a pivotal unlocking lever 17 of the door latch assembly 12 at one end. Sill button rod 15 is connected to the other end of rod 16 by the bell crank assembly 18 of the invention that extends through an extruded hole 20 in the panel 10 as best shown in FIGS. 2 and 3.

Bell crank assembly 18 comprises an inboard lever 22 and an outboard lever 24. Inboard lever 22 has a generally planar input end 26 and a generally planar output end 28 that is offset from the input end 26 in a parallel fashion by a slanted intermediate portion 30. Input end 26 has a resilient socket 32 in the form of a split cylinder for receiving the shaped end 34 of the sill button rod 15. Output end 28 has a round boss 36 that fits in extruded hole 20 with a running fit to provide an axle for pivoting bell crank assembly 18 with respect to panel 11 as best shown in FIGS. 2 and 3.

Figure 3:
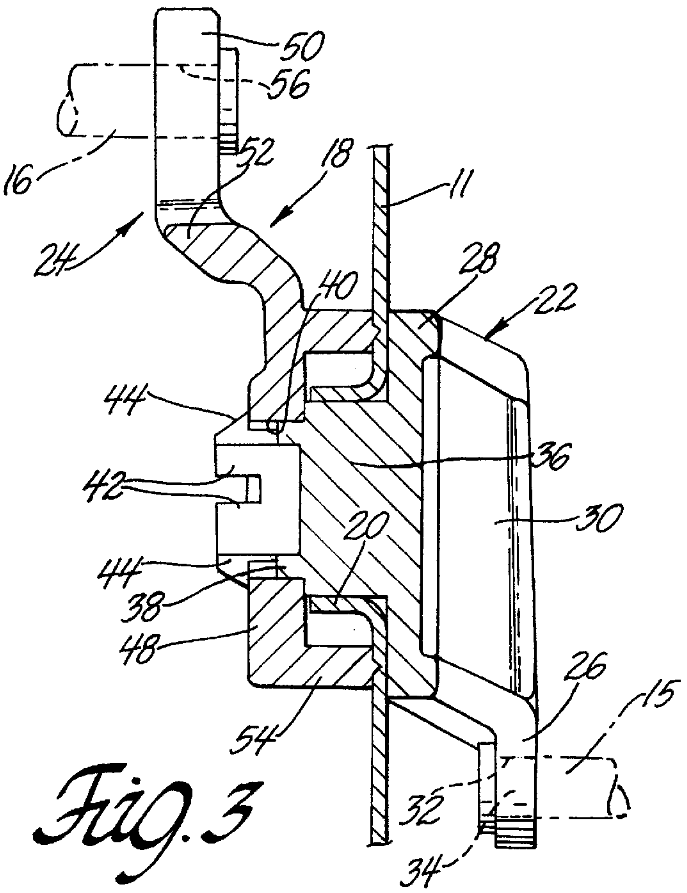
FIG. 3 is a section view taken substantially along the line 3—3 of FIG. 1 looking in the direction of the arrows.
Figure 4:
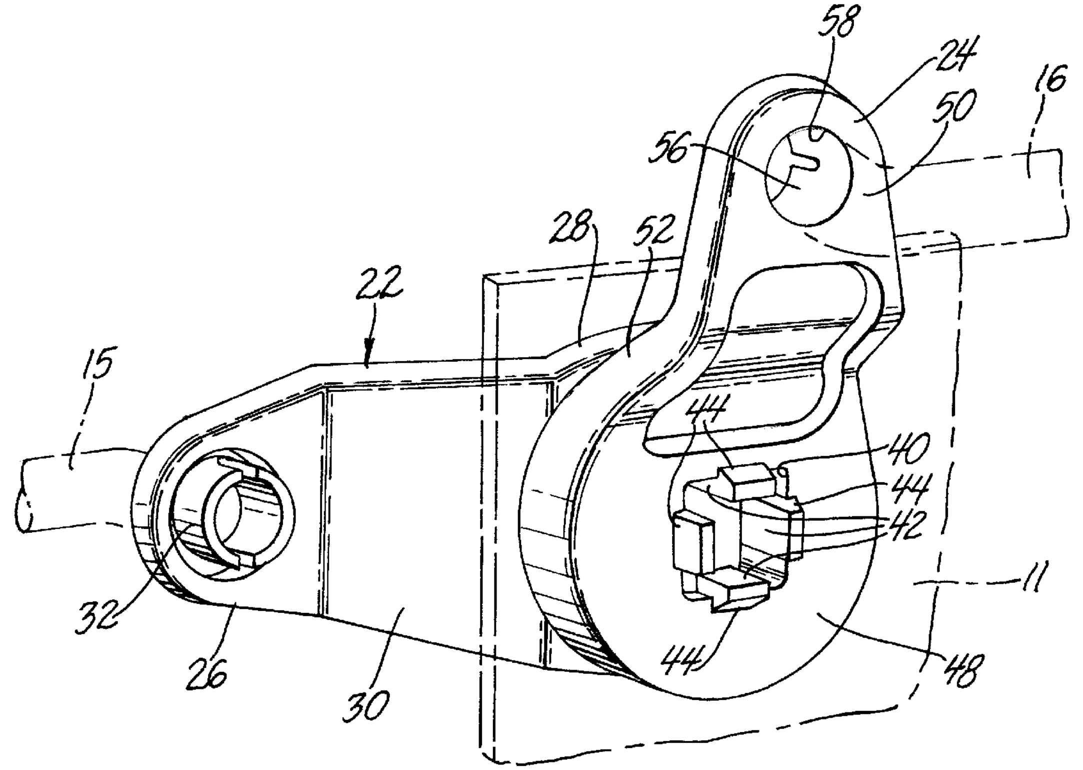
FIG. 4 is a partial perspective view of the automotive door module taken from the exterior or wet side of the door module.
Figure 5:
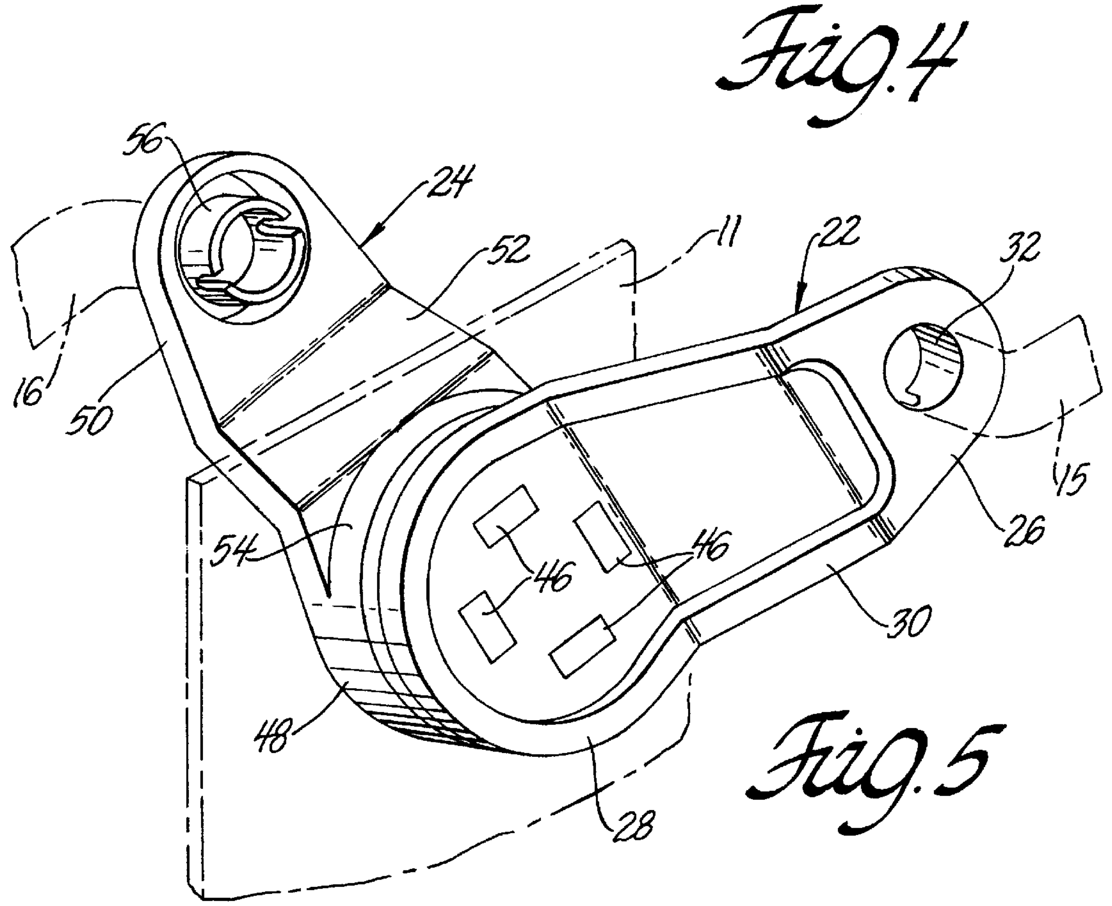
FIG. 5 is a partial perspective view of the automotive door module taken from the interior or dry side of the door module.

The free or outboard end of round boss 36 has a hollow square shaped projection 38 that fits in a matching square hole 40 of the outboard lever 24 as best shown in FIGS. 3 and 4. Each side wall of the hollow square shaped projection 38 supports an aligned, cantilevered latch arm 42 that has a catch 44 at the free end. Each cantilevered latch arm 42 extends through the square hole 40 with its catch 44 engaging an outer surface of the outboard lever 24 adjacent one side of the square hole 40. The output end 28 of inboard lever 22 has four orthogonally related slots 46 that extend through the output end 28 and the round boss 36 in line with the respective outer sides of the cantilevered latch arms 42 as best shown in FIGS. 2 and 4. Slots 46 facilitate molding of catches 44

Outboard lever 24 has a generally planar input end 48 and a generally planar output end 50 that is offset from the input end 48 in parallel fashion by a slanted intermediate portion 52. Input end 48 has a round flange 54 that is spaced outwardly of the square hole 40 and that engages the outer side of panel 10 outwardly of extruded hole 20. Output end 50 has a resilient socket 56 in the form of a split cylinder for receiving the shaped end 58 of rod 16 as best shown in FIG. 4.

Bell crank assembly 14 is installed by placing outboard lever 24 against the exterior surface of panel 11 and then inserting the latch arms 42 of inboard lever 22 through extruded hole 20 of panel 11 and into square hole 40 of outboard lever 24 from the interior side of panel 11. Insertion is continued until round boss 36 seats in extruded hole 20, the hollow square shaped projection 38 seats in square hole 40 and catches 44 snap in place against the outer surface of outboard lever 24 as best shown in FIGS. 2, 3 and 4. When installed, the round flange 54 of the outboard lever 24 is pressed against the outer surface of panel 11 to provide a seal around the extruded hole 20 which prevents water and other contaminants from reaching the interior side of panel 11 through the extruded hole 20. It should also be noted that the inboard and outboard levers 22 and 24 are angularly related by the interaction of the hollow square shaped projection 38 of inboard lever 22 and the matching square hole 40 of outboard lever 24. This angular relation is built into the parts so that the vertical motion of sill button rod 15 is transformed into a generally horizontal motion of rod 16 effectively and efficiently. Moreover, projection 38 preferably fits snugly in matching hole 40 to prevent water leaking past the interface between projection 38 and hole 40.

While a square shaped projection 38 and matching square shaped hole 40 are illustrated for coupling the levers 22 and 24 together for simultaneous rotation, other shapes are also possible. For instance, other polygonal shapes, such as a triangular or a pentagonal shape could be used.

Obviously, many modifications and variations of the present invention in light of the above teachings may be made. It is, therefore, to be understood that, within the scope of the appended claims, the invention may be practiced otherwise than as specifically described.

We claim:

1. A bell crank assembly for an automotive door module of a vehicle having a panel that supports a door latch assembly that includes a lock mechanism that is operated by a sill button inside the vehicle, the sill button being attached to a sill button rod located on the interior or dry side of the panel and moveable generally vertically with respect to the panel, the lock mechanism being operated by the sill button rod via a generally horizontal exterior rod that is located on the exterior or wet side of the panel, the bell crank assembly connecting the sill button rod to the exterior rod through a hole in the panel, the bell crank assembly comprising:

an inboard lever and an outboard lever, the inboard lever having a generally planar input end and a generally planar output end that is offset from the input end in parallel fashion by a slanted intermediate portion, the input end having a resilient socket in the form of a split cylinder for receiving a shaped end of the sill button rod, the output end having a round boss that fits in an extruded hole of the panel with a running fit to provide an axle for pivoting the bell crank assembly with respect to the panel;

the output end having a hollow square shaped projection at an outboard end of the round boss that the fits in a matching square hole of the outboard lever, each side wall of the hollow square shaped projection supporting an aligned, resilient cantilevered latch arm that has a catch at the free end, each resilient cantilevered latch arm extending through the square hole with its catch engaging an outer surface of the outboard lever adjacent one side of the square hole, the output end of the inboard lever having four orthogonally related slots that extend through the output end and the round boss in line with the respective outer sides of the cantilevered latch arms to facilitate molding of the catches, the outboard lever having a generally planar input end and a generally planar output end that is offset from the input end in parallel fashion by a slanted intermediate portion, the input end of the outboard lever having a round flange that is spaced outwardly of the square hole for engaging the outer side of panel outwardly of the extruded hole to form a seal for the extruded hole; and the output end having a resilient socket in the form of a split cylinder for receiving the shaped end of the exterior rod.

2. A bell crank assembly for an automotive door module of a vehicle having a panel that supports a door latch assembly that includes a lock mechanism that is operated by a sill button inside the vehicle, the sill button being attached to a sill button rod located on the interior or dry side of panel and moveable generally vertically with respect to the panel, the lock mechanism being operated by the sill button rod via a generally horizontal exterior rod that is located on the exterior or wet side of the panel, the bell crank assembly connecting the sill button rod to the exterior rod through a hole in the panel, the bell crank assembly comprising:

an inboard lever and an outboard lever, the inboard lever having an input end and an output end, the input end having a resilient socket for receiving a shaped end of the sill button rod, the output end having a round boss that fits in an extruded hole of the panel with a running fit to provide an axle for pivoting the bell crank assembly with respect to the panel;

the output end having a hollow polygon shaped projection at an outboard end of the round boss that the fits in a matching polygon hole of the outboard lever so that the levers pivot simultaneously, the polygon shaped projection supporting a plurality of cantilevered resilient latch arms that have catches at their respective free ends, the plurality of cantilevered resilient latch arms extending through the matching polygon hole with the catches engaging an outer surface of the outboard lever adjacent the polygon hole, the outboard lever having an input end and an output end, the input end of the outboard lever having a flange that is spaced outwardly of the polygon hole and that engages the outer side of panel outwardly of the extruded hole to form a seal for the extruded hole; and the output end having a resilient socket for receiving the shaped end of the exterior rod.

3. A bell crank kit for providing a bell crank assembly on a panel that has a hole, the bell crank kit comprising:

a first lever and a second lever, the first lever having an input end and an output end, the input end being adapted for attachment to a first member, the output end having a round boss that fits in the hole of the panel with a running fit to provide an axle for pivoting the first lever with respect to the panel;

the output end having a shaped projection at an outboard end of the round boss that the fits in a matching hole of the second lever so that the levers pivot simultaneously, the shaped projection supporting a plurality of cantilevered latch arms that have catches at their respective free ends, the plurality of cantilevered latch arms being sized to extending through the matching hole with the catches engaging an outer surface of the second lever adjacent the matching hole, the second lever having an input end and an output end, the input end of the outboard lever having a flange that is spaced outwardly of the shaped hole and sized to engage the outer side of panel outwardly of the hole to form a seal for the hole; and the output end being adapted for attachment to a second member.

* * * * *